US006625809B1

(12) United States Patent
Duff

(10) Patent No.: US 6,625,809 B1
(45) Date of Patent: Sep. 23, 2003

(54) VERSATILE BOOT METHOD FOR A MICROCONTROLLER'S APPLICATION SOFTWARE

(75) Inventor: Brentt Curtus Duff, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/541,398

(22) Filed: Mar. 31, 2000

(51) Int. Cl.[7] .................................................. G06F 9/44
(52) U.S. Cl. ................................... 717/169; 713/2
(58) Field of Search ........................... 713/1–2; 711/4, 711/166; 717/168, 169, 174; 714/23, 36

(56) References Cited

U.S. PATENT DOCUMENTS

| 5,568,641 | A | * | 10/1996 | Nelson et al. | .................. | 711/4 |
| 6,092,190 | A | * | 7/2000 | Lee | ................. | 713/1 |
| 6,272,628 | B1 | * | 8/2001 | Aguilar et al. | ................. | 713/2 |
| 6,275,931 | B1 | * | 8/2001 | Narayanaswamy et al. | .... | 711/4 |

FOREIGN PATENT DOCUMENTS

EP          0788115 A2 *  8/1997  ........... G11C/16/06

\* cited by examiner

Primary Examiner—John Chavis
Assistant Examiner—L J Shrader
(74) Attorney, Agent, or Firm—Jimmy J. Funke; Stefan V. Chmielewski

(57) ABSTRACT

A method (60) for reprogramming application software in a microcontroller (10) without making the microcontroller vulnerable to failure. The method (60) divides the application memory space (18) into five distinct regions including a reset vector space (20), a pre-boot software space (22), and an application software space (24) that is further divided into a main application boot space (26) and a back-up application boot space (28). In another embodiment of the present invention, the application software space (24) is programmed to contain a reset vector jump table (52). The back-up space (28) is programmed (64) to contain data necessary to reprogram the microcontroller until the main application space (26) has been reprogrammed (68) as desired. The back-up boot space (28) cannot be erased until the main application space (26) has been properly reprogrammed. Thereafter, the back-up boot space (28) can be erased (70) and reprogrammed as desired.

7 Claims, 3 Drawing Sheets

VERSATILE BOOT METHOD FOR A MICROCONTROLLER'S APPLICATION SOFTWARE

TECHNICAL FIELD

The present invention relates to a method for booting a microcontroller's application software and more particularly, to a method for reprogramming a microcontroller's application software incorporating a versatile boot method.

BACKGROUND OF THE INVENTION

In general, a microcontroller's operation includes a process for initializing, or beginning, its own internal logic and/or intended software application, also known as a boot method. Prior art boot methods are inherently non-versatile because the boot software is fixed to a particular communications protocol and hardware platform. Due to these limitations, the boot software is not always capable of being upgraded for newer technologies and is often vulnerable to erasure during reprogramming. In many instances, the boot software cannot be reprogrammed and a reprogramming event may lead to a non-repairable fault.

Typically the boot method for a microcontroller's application software is accomplished by the use of reset vector logic contained within the microprocessor, reset vectors in application memory space, application boot software and the application software itself. The reset vectors contain data that points to the beginning address of application boot software and other routines located in the application software. The application boot software typically determines if the application software is present and supplies the appropriate communication algorithms for reprogramming the application memory. The application software controls the functionality of the microcontroller by controlling the operations of the microprocessor. For example, before a microcontroller can be reprogrammed, the application memory space must be erased. If the reset vector is erased, or left blank, the microcontroller has no way of locating either booting or execution software for the application software upon power-on reset. The result is that the microcontroller cannot be re-booted to allow for reprogramming.

Boot-ROM technology is a one time programmable part. It cannot be reprogrammed. Boot-ROM has very limited, if any, capability for upgrading unless the part is removed and replaced with a newer version. Rapid changes in technology require the application boot software be upgraded with each version of the software in order to support changes in the communication protocol, updates to the hardware platform, or to fix known errors in the application boot software. When boot-ROM technology is used, the application boot software cannot,be upgraded; limiting flexibility and adding cost to the microcontroller.

Other known boot methods incorporate a re-programmable boot block that may introduce failure vulnerabilities during a reprogramming event. For example, during a microcontroller reset, the microprocessor will load a program counter with the starting address of the boot block. If the boot block is erased during a reprogramming event, the microcontroller has no way to boot the application software or program the memory space. In certain situations, the microcontroller may become completely inoperable. For example, if a reset occurs during a reprogramming event and the boot block has been erased, the microcontroller has no way of communicating with an external tool, which allows for the reprogramming of the boot block and/or application software.

The methods described above require high-cost drivers, are non-fail-safe, and are very non-flexible in their designs. The application boot software uses large amounts of memory space. Any upgrade requires new hardware, or introduces undesirable vulnerability to microcontroller failure. Additionally, these methods are limited to particular communications protocols and hardware technology.

In the automotive industry in particular, flexibility is key to the small controllers that are used in many automotive applications. Due to size and weight restrictions, automotive applications often employ these small controllers and the controllers are often reprogrammed for upgrades, requiring the memory be erased. Dedicating non-erasable memory space on these small controllers is contrary to the need for flexibility.

SUMMARY OF THE INVENTION

The present invention is a versatile method for reprogramming a microcontroller's application software. The method of the present invention has a space in application memory reserved for pre-boot data. The pre-boot starting address is always fixed and its reset vector pointer cannot be erased. Therefore, the pre-boot starting address is directly referenced in the reset vector space. The purpose of the pre-boot space is to locate valid application boot software in the micro-controller's memory space. The pre-boot space allows the application boot software to be relocated throughout the memory space during a reprogramming event without making the microcontroller vulnerable to failure. The multiple locations for the application boot software allow for a fail-safe method for reprogramming.

According to the method of the present invention, the versatile boot method divides memory into four separate memory spaces; reset vector memory space, pre-boot logic space, a main block in the application software memory space and a back-up block in the application software memory space. In the method of the present invention, a block of the application software memory space is erased and programmed with a back-up application boot. The main block of the application memory is then erased and re-programmed. Finally, the back-up block is erased and reprogrammed with application software. The microcontroller now has upgraded application boot software, reprogrammed communications software and reprogrammed application software without introducing vulnerabilities.

It is an object of the present invention to create a fail-safe method for reprogramming application software in a microprocessor. It is another object of the present invention to allow a complete update of application software including communication software. Yet another object of the present invention is to provide a method for allowing a microprocessor reset to occur during the reprogramming process of application boot memory space.

Other objects and features of the present invention will become apparent when viewed in light of the detailed description of the preferred embodiments and when taken in conjunction with the attached drawings and appended claims.

BRIEF DESCRIPTION OF THE DRAWINGS

In order that the present invention may be well understood, there will now be described some embodiments thereof, given by way of example, with reference to the accompanying drawings, in which.

DESCRIPTION OF THE PREFERRED EMBODIMENT

Figure 1:
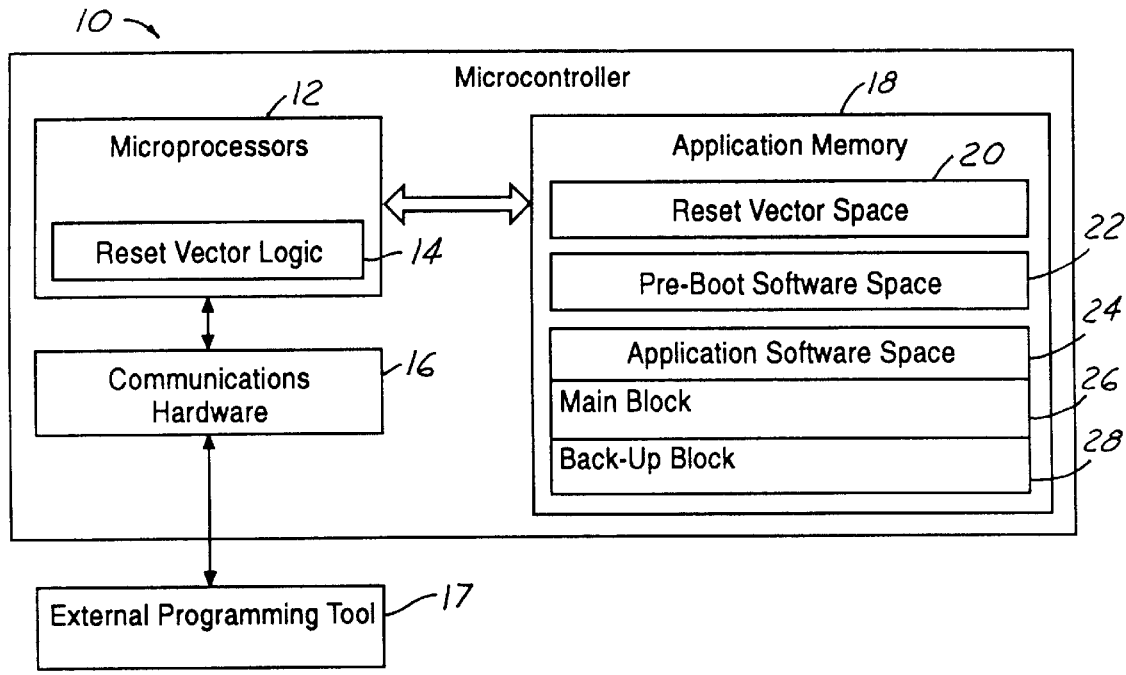
FIG. 1 is a diagram of the application boot memory architecture according to the method of the present invention.

The present invention is a versatile reprogramming method for a microcontroller's application software. The present invention always allows for reprogramming communications to take place even in the event of a power-on reset at any time during the reprogramming event. FIG. 1 is a diagram of the architecture for the memory of a microcontroller 10. The microcontroller 10 has at least one microprocessor 12 whose memory contains reset vector logic 14. The reset vector logic 14 remains unchanged during a reprogramming event. In one embodiment of the present invention, the reset vector logic 14 contains a reset vector jump table, which will be discussed in detail later. The microcontroller 10 also contains communications hardware 16, which varies depending on the make and model of the microcontroller. Also shown in FIG. 1 is an external programming tool 17, which is used to communicate instructions to the microcontroller 10 during a reprogramming event. It is important that the external programming tool 17 always have communication with the microcontroller 10 during a reprogramming event.

According to the present invention, the microcontroller 10, shown in FIG. 1, has an application memory 18 that is divided into four separate memory spaces, including a reset vector space 20, which like the reset vector logic 14, remains unchanged during a reprogramming event. The application memory 18 also contains a pre-boot software space 22 and application software space 24. The application software space 24 is further divided into a main block 26 and a back-up block 28. It should be noted that the application memory space 18 is not limited to a particular type of memory technology, i.e. RAM, ROM, etc. It should also be noted that each memory section does not necessarily have to be contained within the same type of memory technology.

The reset vector space 20 contains the addresses that point to starting addresses of certain algorithms located in the pre-boot and application software spaces 22 and 24 respectively. The reset vector space 20 also contains the starting address for the pre-boot space 22, which is always fixed and directly referenced in the reset vector space 20. The reset vector pointer for the pre-boot space 22 cannot be erased.

The pre-boot space 22 is designed to locate valid application boot software in the application memory 18. The determination of "valid" application boot software is application specific and therefore, the pre-boot logic associated with locating valid boot software is dependent on the application and will not be discussed herein. Because the pre-boot logic has the purpose of finding valid application boot in application memory 18, it is possible to relocate the application boot throughout the memory space 18 during a reprogramming event. The application boot software is located in multiple locations, thereby allowing several options for a fail-safe design.

Figure 2:
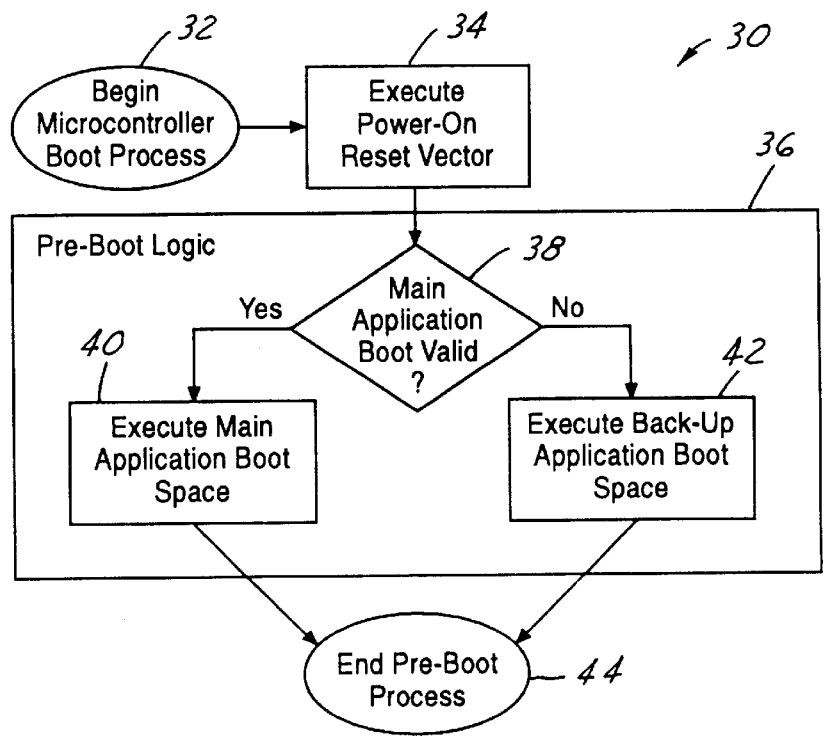
FIG. 2 is a flow chart of the pre-boot logic according to the method of the present invention.

FIG. 2 is a flow chart 30 depicting a possible pre-boot logic that may be used in the method of the present invention. FIG. 2 illustrates an IF, THEN, ELSE conditional determination for the pre-boot logic 30. However, it should be noted that it is possible to implement other methods of using conditional loops to scan application memory in search of valid application boot. One skilled in the art is capable of substituting the IF, THEN, ELSE conditional loop with another method to achieve results similar to those of the present invention.

The microcontroller boot process begins 32 and a power-on reset vector is executed 34. The pre-boot logic 36 searches for valid application boot 38. In the event valid boot is found, the main application boot space is executed 40. In the event no valid application boot is found, the back-up application boot space is executed 42. In any event, once the appropriate boot space is executed, the pre-boot process ends 44.

Figure 3:
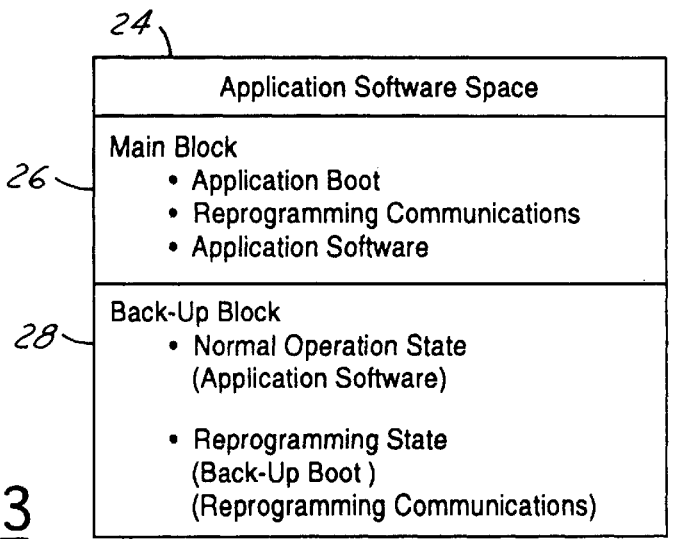
FIG. 3 is a diagram of the memory architecture for the application software space of the present invention.

The application software space 24 is shown in more detail in the diagram of FIG. 3. The application software space must have at least two separate and independently erasable blocks. A main block 26 and a back-up block 28 are shown. The main block 26 contains the application boot that initializes the application. It also contains reprogramming communication routines and the application software itself. The back-up block 28 serves two functions. During normal operation of the microcontroller, the back-up block 28 contains the application software. However, during a reprogramming event, the back-up block becomes the back-up boot and contains the reprogramming communications. This ensures that there is always a means to communicate with the external programming tool, thereby preventing failure vulnerabilities from becoming an issue should a reset of the microcontroller occur during reprogramming.

Figure 4:
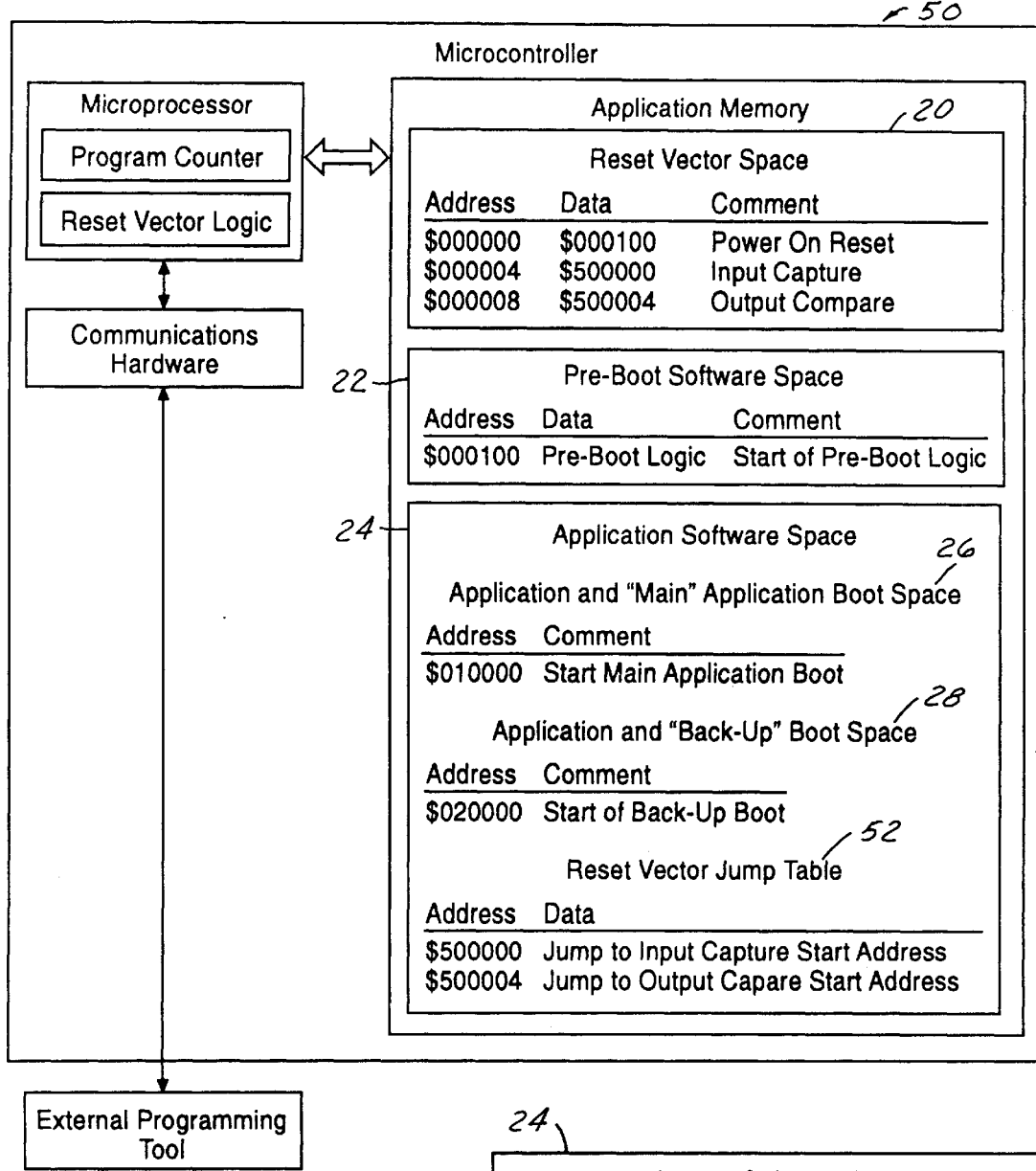
FIG. 4 is a reset vector jump table according to one embodiment of the method of the present invention.

FIG. 4 is a reset vector diagram 50 that has an optional reset vector jump table according to one embodiment of the present invention. The optional reset vector jump table 52 is located in the application memory space 24 along with the main block 26 and the back-up block 28. The reset vector jump table 52 keeps the reset vector space 20 unchanged during a reprogramming event wherein the reset vector space 20 can remain non-erasable. As discussed above, the reset vector space 20 contains reset vectors that point to the starting addresses of algorithms in the pre-boot and application software spaces 26, 28. Erasing the reset vector space 20 may cause vulnerabilities should an unexpected microprocessor reset occur during reprogramming. During reprogramming of the application software these starting addresses often change, which necessitates changes to the data contents in the reset vector space 20. The reset vector jump table 52 allows the starting addresses to change without changing the reset vector space 20. However, the reset vector jump table will not contain the starting address for the pre-boot space 22. The starting address for the pre-boot space 22 is always fixed and its reset vector pointer cannot be erased. It should be noted that if the reset vector space 20 is byte writable/erasable memory technology, then there is no need for a reset vector jump table 52.

In the example shown in FIG. 4, the power on reset vector at address $000000 has the data content $000100, which points to the starting address for the pre-boot logic in the pre-boot software space 22. The reset vector at address $000004 has the data content $500000, which points to the reset vector jump table 52. The reset vector jump table 52 at address $500000 has a jump instruction to the starting address of an input capture routine. The reset vector jump table 52 can be used for all data contents in the reset vector space 20 that cannot be erased during a reprogramming event.

Figure 5:
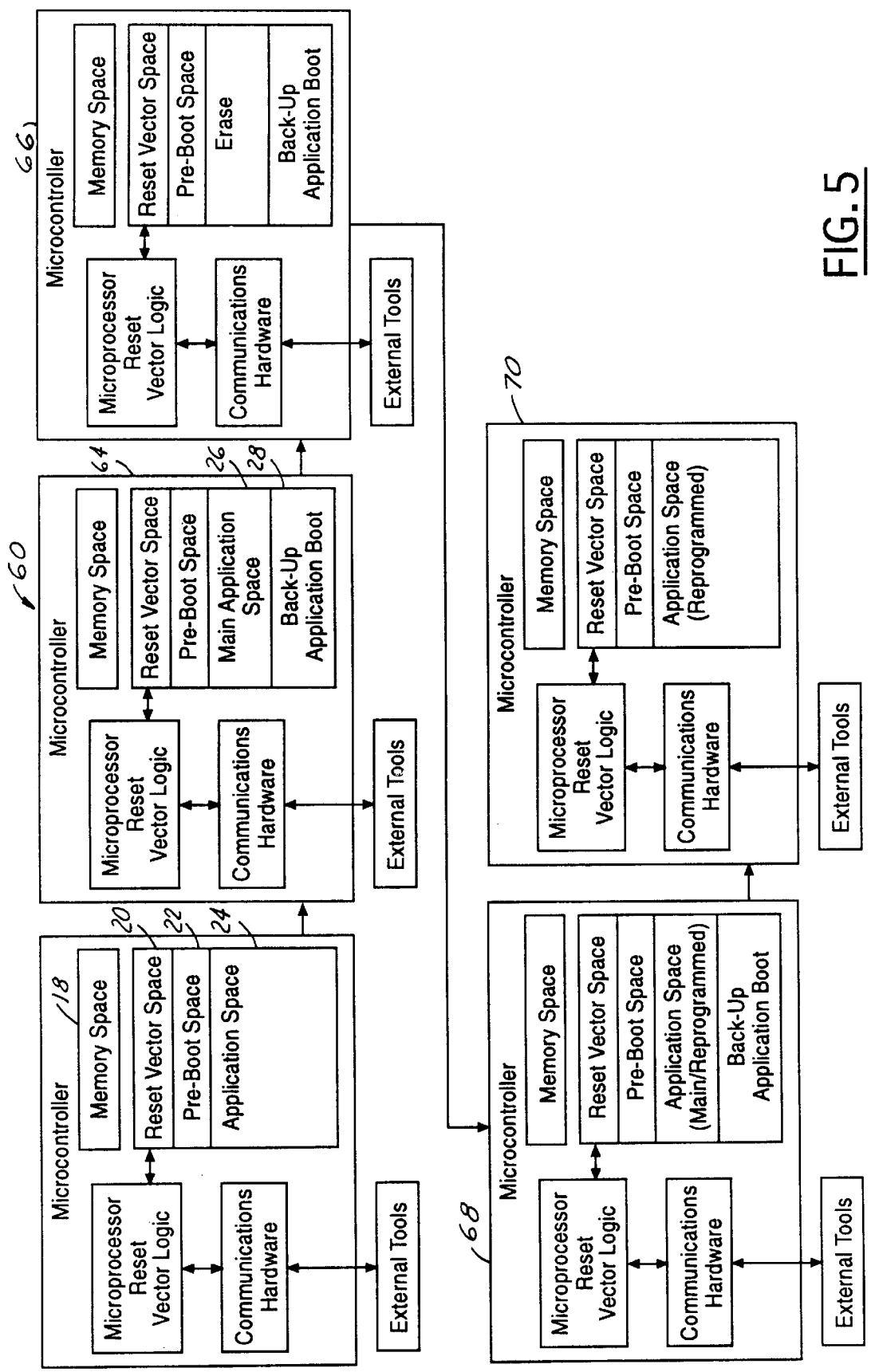
FIG. 5 is a flow chart of a reprogramming event according to one embodiment of the method of the present invention, which incorporates reset vector logic.

FIG. 5 is a flow chart 60 illustrating how the application space can be reprogrammed while maintaining application boot in memory according to the method of the present invention. During normal operation 62 memory space 18 contains the reset vector space 20, the pre-boot space 22 and the application space 24. During normal operation 62, the application space 24 contains its own boot routines, reprogramming communication routines, and, optionally, a reset vector jump table. During a reprogramming event 64, a block of the application memory space is erased and a back-up application boot 28 is programmed. The result is a main block 26, and a back-up block 28. The back-up block 28 contains the necessary reprogramming communication routine and boot logic for the reprogramming event. The back-up application boot block 28 cannot be erased if the main application space is not valid. This is a fail-safe way to maintain communication with the external tools. A validity check can be accomplished in any one of many methods that are known to one skilled in the art.

Once the back-up block 28 has been programmed, the main application space 26 is erased 66. Should a power on reset occur at this point in the reprogramming event, the main application space is backed-up in the back-up block 28, which as discussed above, cannot be erased. Therefore, reprogramming can continue without a failure.

Once the main application space is erased, it can be programmed 68 as desired. The main application space 26 now contains the application boot, the reprogramming communication routines and logic to determine if the back-up is present, or the main application space contains valid application software. Once the reprogramming of the main application space is complete, the back-up application space can be erased and programmed 70 with application software. The reprogramming event is complete and the microcontroller is fully programmed with valid application software. The microcontroller now contains upgraded application boot, reprogramming communication routines, and application software. No vulnerabilities have been introduced according to the method of the present invention.

While particular embodiments of the invention have been shown and described, numerous variations and alternate embodiments will occur to those skilled in the art. Accordingly, it is intended that the invention be limited only in terms of the appended claims.

What is claimed is:

1. A method for reprogramming application software in a microcontroller having an application memory space, said method comprising the steps of:

dividing the application memory space into a fixed reset vector space that remains unchanged during reprogramming application software, a pre-boot software space having a fixed starting address directly referenced in said fixed reset vector space, a main block of application software space and a back-up block of application software space;

erasing a block of said application software space;

programming said back-up block of said application software space with application boot software;

erasing said main block of said application software space;

programming said main block of said application software space with application boot software;

erasing said back-up block of said application software space; and reprogramming said back-up block of said application software space with application software;

2. The method as claimed in claim 1 wherein said step of programming said back-up block of said application software space further comprises programming said back-up block with a logic routine for preventing erasure of said back-up block in the absence of a valid main block of application software space.

3. The method as claimed in claim 2 further comprising the step of determining said main block of application software contains valid application software before erasing said back-up block of said application software space.

4. The method as claimed in claim 1 further comprising the step of programming a reset vector jump table into said application software space.

5. A method for reprogramming application software in a microcontroller having an application memory space, said method comprising the steps of:

dividing the application memory space into a fixed reset vector space that remains unchanged during reprogramming application software, a pre-boot software space having a fixed starting address directly referenced in said fixed reset vector space, a main block of application software space and a back-up block of application software space;

erasing a block of said application software space;

programming said back-up block of said application software space with a reprogramming communication routine and boot logic;

erasing said main block of application software space;

programming said main block of said application software space with a desired application software, a reprogramming communication routine and boot logic;

erasing said back-up block of said application software space; and reprogramming said back-up block of said application software space with a desired application software.

6. The method as claimed in claim 5 wherein said step of programming said back-up block of said application software space with a reprogramming communication routine and boot logic further comprises programming said back-up block with a logic routine for preventing erasure of said back-up block in the absence of a valid main block of application software space.

7. The method as claimed in claim 6 further comprising the step of determining said main block of application software contains valid application software before erasing said back-up block of said application software.

* * * * *